United States Patent
Egner-Walter et al.

(10) Patent No.: US 9,102,308 B2
(45) Date of Patent: Aug. 11, 2015

(54) WIPER DEVICE FOR THE CLEANING OF VEHICLE WINDOWS

(71) Applicants: Bruno Egner-Walter, Heilbronn (DE); Michael Schaeuble, Vaihingen/Enz (DE)

(72) Inventors: Bruno Egner-Walter, Heilbronn (DE); Michael Schaeuble, Vaihingen/Enz (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 210 days.

(21) Appl. No.: 13/728,245

(22) Filed: Dec. 27, 2012

(65) Prior Publication Data
US 2013/0167316 A1    Jul. 4, 2013

(30) Foreign Application Priority Data
Dec. 28, 2011   (DE) .................. 10 2011 057 094

(51) Int. Cl.
*B60S 1/38*   (2006.01)
*B60S 1/40*   (2006.01)
(Continued)

(52) U.S. Cl.
CPC ............ *B60S 1/0491* (2013.01); *B60S 1/3429* (2013.01); *B60S 1/40* (2013.01); *B60S 1/4048* (2013.01); *B60S 2001/3844* (2013.01)

(58) Field of Classification Search
CPC .... B60S 1/3801; B60S 1/3806; B60S 1/3849; B60S 1/3867; B60S 1/3429; B60S 1/4048; B60S 1/0491; B60S 1/40; B60S 1/4006; B60S 1/4016; B60S 1/4019; B60S 2001/3844
USPC ........... 15/250.48, 250.361, 250.32, 250.351, 15/250.001, 250.43, 250.44
See application file for complete search history.

(56) References Cited

U.S. PATENT DOCUMENTS

| 2,971,209 | A | * | 2/1961 | Coulter ................. 15/250.4 |
| 7,823,247 | B2 | * | 11/2010 | Poton ................. 15/250.32 |
| 2007/0094833 | A1 | | 5/2007 | Poton |

(Continued)

FOREIGN PATENT DOCUMENTS

| DE | 43 22 200 A1 | 1/1995 |
| DE | 69922410 T2 | 12/2005 |

(Continued)

OTHER PUBLICATIONS

Search Report issued in corresponding German Application No. 10 2011 057 094.2 on Sep. 12, 2012 (2 pages).

*Primary Examiner* — Gary Graham
(74) *Attorney, Agent, or Firm* — Osha Liang LLP

(57) ABSTRACT

The invention relates to a wiper device (100) for the cleaning of vehicle windows (1), with a wiper blade (10) having a wiper rubber (12), which wiper blade is able to be fastened exchangeably on a wiper arm (2) by means of a wiper blade adapter (11), wherein between the wiper blade adapter (11) and the wiper arm (2) a detent connection (15) is constructed, which comprises a detent element which is arranged on the wiper blade adapter (11) and which engages in a form-fitting manner into a corresponding opening (16) or recess on the wiper arm (2). According to the invention, the wiper blade (10) has an ageing indicator element (21) for the wiper blade (10), said ageing element being covered by a protective element (25), wherein the protective element (25) is constructed such that, and/or is arranged on the wiper blade (10) such that a mounting of the wiper blade (10) on the wiper arm (2) is only possible after a removal of the protective element (25) from the ageing indicator element (21).

8 Claims, 2 Drawing Sheets

(51) Int. Cl.
*B60S 1/04* (2006.01)
*B60S 1/34* (2006.01)

(56) References Cited

U.S. PATENT DOCUMENTS

2010/0306950 A1* 12/2010 Beelen et al. ............ 15/250.201
2011/0005020 A1* 1/2011 Koppen et al. ............ 15/250.32

FOREIGN PATENT DOCUMENTS

| EP | 1103435 | A1 | * | 11/1999 |
| FR | 2843083 | | * | 2/2004 |
| FR | 2860470 | | * | 4/2005 |
| FR | 2909346 | | * | 6/2008 |
| KR | 10-0894436 | | * | 4/2009 |
| WO | 2010/034439 | A1 | | 4/2010 |

\* cited by examiner

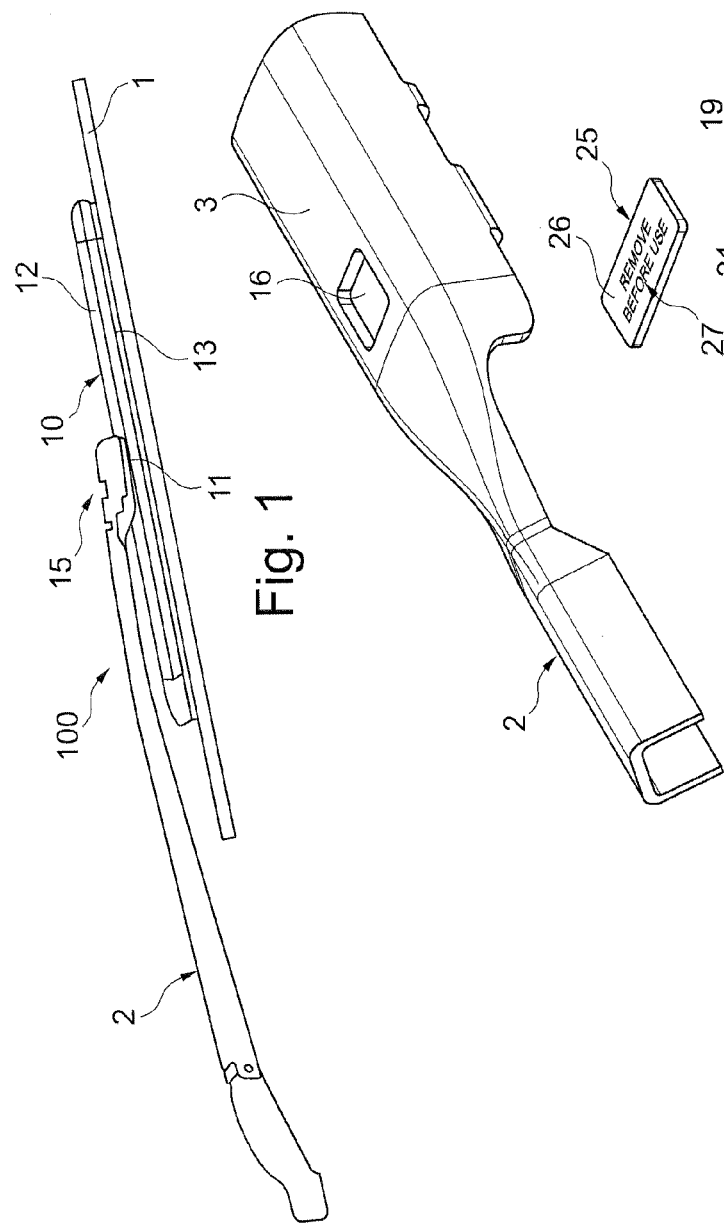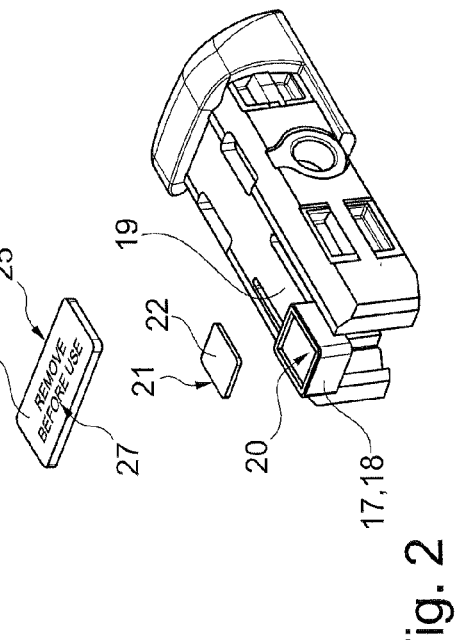

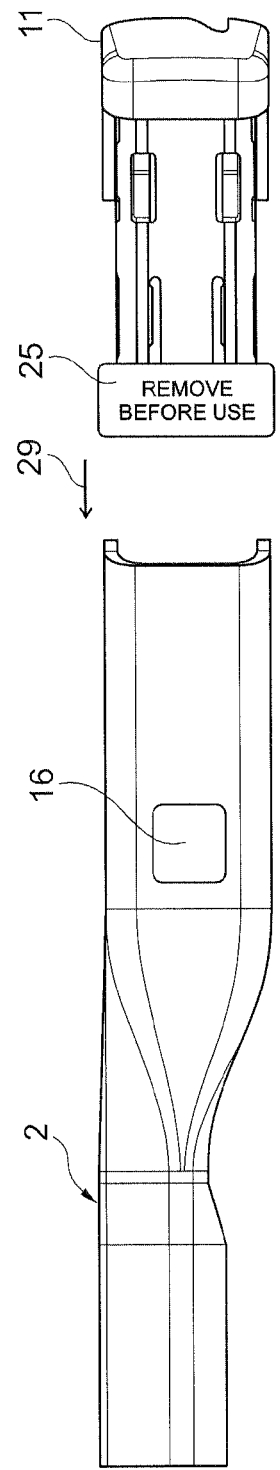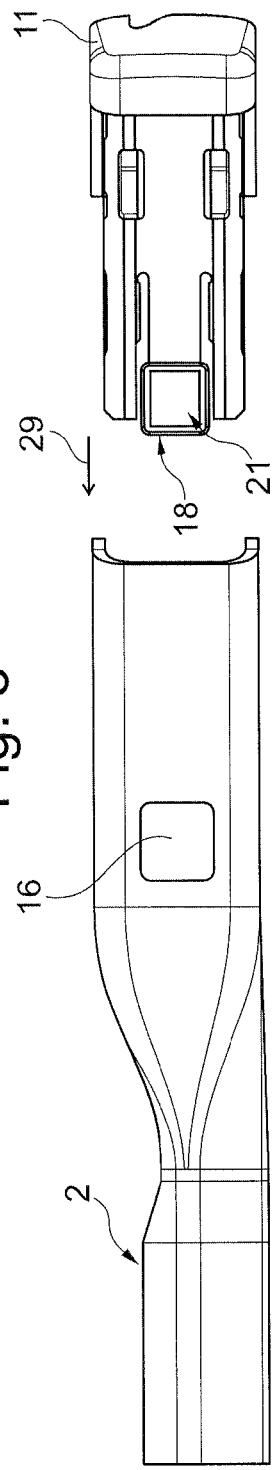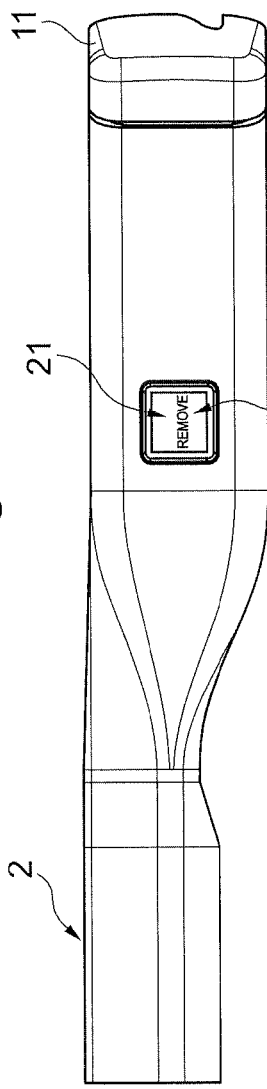

WIPER DEVICE FOR THE CLEANING OF VEHICLE WINDOWS

PRIOR ART

The invention relates to a wiper device for the cleaning of vehicle windows according to the preamble of claim 1. Furthermore, the invention relates to a wiper blade for use in a wiper device according to the invention.

A wiper device according to the preamble of claim 1 is already generally known from the prior art. A wiper device of this type has a wiper blade which has only a limited service life. The length of the service life is affected by the frequency of use of the wiper blade and the conditions under which the wiper lip of the wiper blade cleans a vehicle window, and the environmental conditions to which the wiper blade is exposed over the period of use thereof. Since, in particular, the wiper rubber of the wiper blade ages as a consequence of UV radiation and other environmental influences even if the wiper blade is not even in use, it is desirable to indicate to a user if the user should replace the wiper blade for safety reasons.

The applicant's DE 699 22 410 C2 therefore discloses an ageing indicator element which is arranged at the side of the wiper blade. The ageing indicator element is composed of a material, the color of which changes under the influence of environmental conditions. In order to ensure that the ageing indicator element is activated only when it is located on the wiper arm of the wiper device, i.e. on the motor vehicle, the known ageing indicator element furthermore has a protective element in the form of a protective film which is intended to be removed by the user when fitting the wiper blade to the wiper arm so that the function of the ageing indicator element is activated. A disadvantage in this case is that the user frequently does not pay this any attention or, in order to be able to use the wiper blade for as long as possible, the user only removes the protective film from the ageing indicator element at a later time, if at all.

DISCLOSURE OF THE INVENTION

Taking the depicted prior art as the starting point, the invention is based on the object of developing a wiper device for the cleaning of the vehicle windows according to the preamble of claim 1 in such a manner that, when exchanging a wiper blade on a wiper arm, it is ensured that the ageing indicator element inevitably has to be activated by a user. This object is achieved according to the invention in a wiper device for the cleaning of vehicle windows having the features of claim 1 in that the protective element is constructed such that, and/or, is arranged on the wiper blade such that a mounting of the wiper blade on the wiper arm is only possible after a removal of the protective element from the ageing indicator element.

Advantageous developments of the wiper device according to the invention for the cleaning of vehicle windows are cited in the dependent claims. The scope of the invention includes all combinations of at least two of the features disclosed in the claims, the description and/or the drawings.

In a structurally particularly preferred refinement of the invention, provision is made for a detent element to be constructed on the wiper blade on the upper side of the wiper blade adapter in the form of a detent tongue with an actuating button, for the actuating button to be arranged so as to be visible from the exterior when the wiper blade is mounted on the wiper arm, and for the ageing indicator element to be arranged in the region of the upper side of the actuating button. Such an arrangement of the ageing indicator element has the advantage in particular that said ageing indicator element is very easily visible to a user, and therefore said user detects in a particularly simple manner whether a wiper blade should be exchanged.

In the last-mentioned refinement and arrangement of the ageing indicator element, it is particularly preferred if said ageing indicator element is constructed in a plate shape and is held in a form-fitting manner in a depression which is constructed on the upper side of the actuating button. By means of the arrangement of the ageing indicator element in the depression, in particular a conscious removal of the ageing indicator element, or removal caused by external influences, for example by passing through a washing system, is made more difficult or is prevented, since the end edges of the ageing indicator element are arranged protected in the depression.

In order to ensure that the ageing indicator element is activated as soon as a new wiper blade is fastened to the wiper arm, it is proposed in particular that the protective element is detachably connected with the ageing indicator element and has a greater area than the opening or recess on the wiper arm, which opening or recess serves for latching the wiper blade to the wiper arm. By the protective element having the greater area, correct functioning or locking of the wiper blade to the wiper arm is made possible only if the protective element is removed beforehand from the ageing indicator element and therefore the ageing indicator element is activated.

Provision is furthermore preferably provided for the protective element to consist of a rigid material, preferably of plastic. The use of the rigid material in particular assists the necessity of removing the protective element from the ageing indicator element, since, for example in contrast to a construction in which the protective element consists of a flexible film, mounting of the wiper blade on the wiper arm without having previously removed the protective element from the ageing indicator element can be reliably avoided.

In order not to unnecessarily increase the size of a blister pack or cardboard pack in which a wiper blade is customarily packed so that the volume of the pack is not unnecessarily increased and the production costs thereof made more expensive, it is furthermore proposed that the protective element does not project over the wiper blade adapter in its width.

In order to facilitate the handling and in order to explain the protective element to a user, provision is preferably made for the protective element to be provided with a handling indication in the form of an inscription. A handling indication of this type may consist in particular in that the user is instructed that the protective element must be removed before the wiper blade is fitted.

In a further particularly preferred refinement of the ageing indicator element, in which the necessity of exchanging the wiper blade is particularly clearly indicated, the ageing indicator element in its new state has a color which is matched to the color of the wiper arm, and, on ageing of the ageing indicator element, the latter has a color change, which forms a contrast to the color of the wiper arm.

In a further refinement of the variant embodiment last mentioned, it can additionally be provided that through the color change, an explicit indication for exchanging the wiper blade, in the form of a further inscription, is visible. This clearly signals even to a user to whom the significance of the color change is not known per se that a wiper blade should be exchanged.

The invention also comprises a wiper blade for use in a wiper device according to the invention. A wiper blade of this type has the advantage of being able to be fitted on a wiper arm only after removal of the protective element from an ageing indicator element.

Further advantages, features and details of the invention emerge from the description below of preferred exemplary embodiments and with reference to the drawing, in which:

FIG. 1 shows a side view of a wiper device for the cleaning of vehicle windows,

FIG. 2 shows, in an exploded illustration, that end region of a wiper arm which faces a wiper blade, and also parts of a wiper blade adapter,

FIG. 3 and

FIG. 4 show the wiper blade adapter and the end region of the wiper arm before and after removal of a protective element, and FIG. 5 shows a top view of the wiper arm in the region of the ageing indicator element, wherein the ageing indicator element indicates a wiper blade which is to be exchanged.

Identical components and components having an identical function are provided with the same reference numbers in the drawings.

FIG. 1 illustrates a wiper device 100 for the cleaning of a vehicle window 1. The wiper device 100 comprises a wiper arm 2 to which a wiper blade 10 is fastened exchangeably by means of a wiper blade adapter 11. In addition to the wiper blade adapter 11, the wiper blade 10 comprises a rubber wiper blade body 12 with a wiper lip 13. The wiper blade 10 is fastened to the wiper arm 2 in a manner known per se by means of a detent connection 15 formed between the wiper blade adapter 11 and the wiper arm 2. As is visible in particular with reference to FIG. 2, the detent connection 15 on the upper side 3 of the wiper arm 2 at that end region of the wiper arm 2 which faces the wiper blade 10 comprises an opening or recess which is of square design in the exemplary embodiment and is in the form of an aperture 16. In the mounted state of the wiper blade 10, the aperture 16 interacts with an elevation 17 which is arranged on the wiper blade adapter 11 and is in the form of an actuating button 18 which, when the wiper blade 10 is mounted, protrudes in a form-fitting manner into the aperture 16 and blocks the wiper blade 10 in the longitudinal direction of the wiper blade. Furthermore, the wiper blade 10 is connected in the region of the wiper blade adapter 11 in a manner which is likewise known by the wiper arm 2, which has a U-shaped cross section in the connecting region to the wiper blade 10.

The actuating button 18 is arranged on a securing tongue 19, which is arranged resiliently on the wiper blade adapter 11, and forms a detent element with said securing tongue. The upper side of the actuating button 18 has a depression 20 which is of square design in the exemplary embodiment. An ageing indicator element 21 in a plate shape is held in a form-fitting manner in the depression 20, said ageing indicator element, when exposed, for example, to solar radiation and/or other external influences, indicates to a user over time by means of a color change that the user should exchange the wiper blade 10.

With regard to further details of an ageing indicator element 21 constructed in such a manner reference is made by way of example, but not in a limiting manner, to the applicant's DE 699 22 410 T2, which is intended in this respect to be part of this application.

The ageing indicator element 21 arranged within the depression 20 ends with the upper side 22 thereof flush with the upper side of the actuating button 18 in such a manner that, when the wiper blade 10 is mounted on the wiper arm 2, the upper side 22 of the ageing indicator element 21 runs approximately flush with the upper side 3 of the wiper arm 2, but at any rate does not project over the upper side 3 of the wiper arm 2.

In the delivery state of the wiper blade 10, in which the latter is not yet connected to the wiper arm 2, the upper side 22 of the ageing indicator element 21 is covered by a protective element 25 which is detachably connected to the upper side 22 of the ageing indicator element 21, preferably by means of a pressure-sensitive adhesive layer. In the exemplary embodiment, the protective element 25 has a rectangular shape and is composed of a rigid plastics material. As is visible in particular with reference to FIGS. 2 and 3, the protective element 25 completely covers the ageing indicator element 21 and projects laterally beyond the latter. However, the width of the protective element 25 does not project laterally over the wiper blade adapter 11. Furthermore, an inscription 27 with an operating instruction for a user is imprinted on the upper aide 26 of the protective element 25.

In the exemplary embodiment of the wiper device 100 illustrated in the figures, in order to mount a wiper blade 10 on the wiper arm 2, the wiper blade 10 or the wiper blade adapter 11 has to be introduced in the direction of the arrow 29 into the opening cross section of the wiper arm 2 until the actuating button 18 latches in the aperture 16 and locks the wiper blade 10 to the wiper arm 2. It is obvious that that this cannot take place when the protective element 25 is fitted, since the protective element 25 prevents the wiper blade adapter 11 from being inserted into the opening cross section of the wiper arm 2. Furthermore, even in the event of a possible pushing of the wiper blade adapter 11 into the opening cross section of the wiper arm 2, it would not be possible for the actuating button 18 to latch with the aperture 16, since the size of the actuating button 18 is matched to the size of the aperture 16, and the protective element 25 is of a size which is greater than the aperture 16. Therefore, for mounting of the wiper blade 10 on the wiper arm 2, a user has to remove the protective element 25 from the upper side 22 of the ageing indicator element 21 before the wiper blade 10 is mounted. As a result, the ageing indicator element 21 is activated in respect of the function thereof in the desired manner.

Provision is preferably made for the upper side 22 of the ageing indicator element 21, in the new state, to have a color which is matched to the color on the upper side 3 of the wiper arm 2. As a result, a homogeneous appearance of the wiper arm 2 is visible to the user in the new state of the wiper blade 10. By means of the color change of the ageing indicator element 21 over time, the latter preferably changes on account of chemical conversion processes into a color which forms a contrast to the upper side 3 of the wiper arm 2 and therefore indicates to a user that an exchange of the wiper blade 10 is required.

According to FIG. 5, provision may be made for partial regions of the upper side 22 of the ageing indicator element 21 to be treated in such a manner that not only does the discussed change in color take place but, moreover, a further inscription 30 is visible, said inscription explicitly indicating to the user that exchange of the wiper blade 10 is required or is desirable.

The wiper device 100 described to this extent, or the wiper blade 10 and the wiper arm 2 can be modified in diverse ways without departing from the concept of the invention. The only essential feature is for the ageing indicator element 21 to be constructed in such a manner and equipped with a protective element 25 in such a manner that the wiper blade 10 can be mounted on the wiper arm 2 only if the protective element 25 has previously been removed from the ageing indicator element 21.

LIST OF REFERENCE NUMBERS

1 Vehicle window
2 Wiper arm

3 Upper side
10 Wiper blade
11 Wiper blade adapter
12 Wiper blade body
13 Wiper lip
15 Detent connection
16 Aperture
17 Elevation
18 Actuating button
19 Securing tongue
20 Depression
21 Ageing indicator element
22 Upper side
25 Protective element
26 Upper side
27 Inscription
29 Arrow
30 Inscription
100 Wiper device

The invention claimed is:

1. A wiper device for the cleaning of vehicle windows, comprising:
 a wiper blade having a wiper rubber, wherein the wiper blade is configured to be fastened exchangeably on a wiper arm by a wiper blade adapter,
 wherein between the wiper blade adapter and the wiper arm a detent connection is constructed, which comprises a detent element which is arranged on the wiper blade adapter and which is configured to engage in a form-fitting manner into a corresponding opening or recess on the wiper arm,
 wherein the wiper blade adapter has an ageing indicator element for the wiper blade, said ageing element being covered by a protective element, wherein the protective element is constructed or arranged on the wiper blade adapter such that a mounting of the wiper blade on the wiper arm is only possible after a removal of the protective element from the ageing indicator element,
 wherein the ageing indicator is disposed at least on the detent element, and
 wherein the protective element covering the ageing indicator element has a greater area than the opening or recess on the wiper arm.

2. The wiper device according to claim 1, wherein the detent element is constructed on the wiper blade on an upper side of the wiper blade adapter in the form of a securing tongue with an actuating button, wherein the actuating button is arranged so as to be visible from an exterior when the wiper blade is mounted on the wiper arm, and wherein the ageing indicator element is arranged in a region of an upper side of the actuating button.

3. The wiper device according to claim 2, wherein the ageing indicator element is constructed in a plate shape and is held in a form-fitting manner in a depression which is constructed on the upper side of the actuating button.

4. The wiper device according to claim 2, wherein the protective element consists of plastic.

5. The wiper device according to claim 1, wherein the protective element does not project over the wiper blade adapter in its width.

6. The wiper device according to claim 1, wherein the protective element is marked with an inscription.

7. The wiper device according to claim 6, wherein the ageing indicator element in its new state has a color which is matched to a color of the wiper arm, and wherein on ageing of the ageing indicator element, the latter has a color change, which forms a contrast to the color of the wiper arm.

8. The wiper device according to claim 7, wherein through the color change, an indication for exchanging the wiper blade, in a form of a further inscription, is visible.

* * * * *